United States Patent [19]

Albrecht

[11] Patent Number: 5,390,631
[45] Date of Patent: Feb. 21, 1995

[54] USE OF SINGLE-LEAD AND MULTI-LEAD RIBBED TUBING FOR SLIDING PRESSURE ONCE-THROUGH BOILERS

[75] Inventor: Melvin J. Albrecht, Homeworth, Ohio

[73] Assignee: The Babcock & Wilcox Company, New Orleans, La.

[21] Appl. No.: 249,183

[22] Filed: May 25, 1994

[51] Int. Cl.6 .............................................. F22B 15/00
[52] U.S. Cl. .............................. 122/235.12; 122/6 A; 122/235.14; 122/235.23; 122/406.4
[58] Field of Search ............. 122/6 A, 235.12, 235.14, 122/235.23, 235.29, 406.4

[56] References Cited

U.S. PATENT DOCUMENTS

| | | | |
|---|---|---|---|
| 3,060,903 | 10/1962 | Rudd | 122/235 |
| 3,088,494 | 5/1963 | Koch et al. | 138/37 |
| 3,175,367 | 3/1965 | Gorzegno et al. | 60/73 |
| 3,194,217 | 7/1965 | Grabowski | 122/379 |
| 3,205,664 | 9/1965 | Nettel | 60/70 |
| 3,243,961 | 4/1966 | Caracristi | 60/105 |
| 3,262,431 | 7/1966 | Hanzalek | 122/406 |
| 3,271,961 | 9/1966 | Wiener | 60/105 |
| 3,286,466 | 11/1966 | Stevens | 60/105 |
| 3,289,451 | 12/1966 | Koch et al. | 72/283 |
| 3,304,716 | 2/1967 | Griffin et al. | 60/105 |
| 3,362,164 | 1/1968 | Rudd | 60/105 |
| 3,366,093 | 1/1968 | Stevens et al. | 122/406 |
| 3,472,208 | 10/1969 | Gorzegno et al. | 122/406 |
| 3,529,580 | 9/1970 | Stevens | 122/406 |
| 3,572,036 | 3/1971 | Beckman | 60/104 |
| 3,612,005 | 10/1971 | Lytle | 122/406 |
| 3,741,174 | 6/1973 | Rudd et al. | 122/510 |
| 3,774,579 | 11/1973 | Sakai et al. | 122/1 C |
| 3,781,162 | 12/1973 | Rudd et al. | 431/115 |
| 3,789,806 | 2/1974 | Gorzegno | 122/406 |
| 3,954,087 | 5/1976 | Stevens et al. | 122/406 |
| 4,019,467 | 4/1977 | Binstock | 122/406 |
| 4,068,475 | 1/1978 | Binstock | 60/646 |
| 4,099,384 | 7/1978 | Stevens et al. | 60/657 |
| 4,241,585 | 12/1980 | Gorzegno | 60/646 |
| 4,262,636 | 4/1981 | Augsburger | 122/406 |
| 4,311,013 | 1/1982 | Kuribayashi et al. | 60/646 |
| 4,338,789 | 7/1982 | Dolan | 60/652 |
| 4,430,962 | 2/1984 | Miszak | 122/406.5 |
| 4,487,166 | 12/1984 | Haller et al. | 122/406 |
| 4,665,706 | 5/1987 | Russell et al. | 60/646 |
| 4,926,799 | 5/1990 | Wittchow | 122/235.12 |
| 4,987,862 | 1/1991 | Wittchow et al. | 122/6 A |

OTHER PUBLICATIONS

"Heat Transfer Characteristics of Rifled Tubes in the Near Critical Pressure Region", M. Iwabuchi, M. Tateiwa, H. Haneda, Proceedings of the 7th International Heat Transfer Conference, vol. 5, 1982 pp. 313-318.

"Latest Developments in Natural Circulation Boiler Design", M. Wiener, Proceedings of the American Power Conference, Apr. 18-20, 1977.

"Elements of Two-Phase Flow in Fossil Boilers", J. B. Kitto & M. J. Albrecht, presented to the NATO Advanced Study Institute on Thermal-Hydraulic Fundamentals and Design of Two-Phase Flow Heat Exchangers, Porto, Portugal, Jul. 6-16, 1987 entire paper.

"Fossil-Fuel-Fired Boilers: Fundamentals and Elements", J. B. Kitto & M. J. Albrecht, Chap. 6 of Boilers, Evaporators and Condensers, pp. 179-275, John Wiley & Sons, Inc. (no date).

(List continued on next page.)

Primary Examiner—Edward G. Favors
Attorney, Agent, or Firm—Robert J. Edwards; Robert Marich

[57] ABSTRACT

A vertical tube, once-through, sliding pressure steam generator comprises a furnace having an outlet and heat exchanger surfaces made of smooth bore tubes, single-lead ribbed (SLR) tubes, and multiple-lead ribbed (MLR) tubes. All of these tubes are preferably constructed as membrane wall tube panels. The steam generator includes fuel burners for burning fuel and air within the housing, creating low, medium and high heat flux regions within the furnace. Fluid flows through the tubes of the wall panels to provide an efficient heat exchanger. The smooth bore tubes are located at the low heat flux regions, and the SLR and/or MLR tubes are located in the high and medium heat flux regions.

20 Claims, 6 Drawing Sheets

OTHER PUBLICATIONS

"The Effects of Nucleate Boiling Versus Film Boiling on Heat Transfer in Power Boiler Tubes" H. S. Swenson, J. R. Carver, G. Szoeke, Journal of Engineering for Power, Trans. ASME, Oct. 1962, pp. 365–371.

"Flow Boiling Crisis in Grooved Boiler-Tubes", K. Nishikawa, T. Fujii, S. Yoshida & M. Ohno, Proceedings of the Fifth International Heat Transfer Conference, vol. IV, 1974, pp. 270–274.

"Steam: its generation and use", 40th ed. Copyright ©1992, The Babcock & Wilcox Company 5-2 to 5-8 (no date).

USE OF SINGLE-LEAD AND MULTI-LEAD RIBBED TUBING FOR SLIDING PRESSURE ONCE-THROUGH BOILERS

FIELD AND BACKGROUND OF THE INVENTION

The present invention generally relates to boilers or steam generators for electric power generation and, in particular, to a new and useful design of a sliding pressure once-through boiler using both single-lead and multi-lead ribbed tubing.

Figure 1:
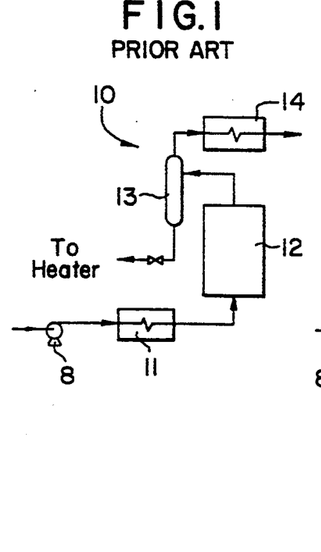
FIG. 1 is a schematic view illustrating one known once-through boiler system.

In the power plant field, once-through boilers have been used since 1926. The design of the once-through boiler includes provisions for sliding pressure operation to accommodate supercritical steam pressure. As shown in FIG. 1, a boiler feed pump 8 for the system 10 provides the entire driving head to force the water through an economizer 11, an evaporator 12, and a superheater 14 which can be used in conjunction with a separator 13. Water is continuously evaporated to dryness and then superheated without any steam-water separation. This circulation method is applicable to all operating pressures, i.e. supercritical (greater than 3208 psia) and subcritical (less than 3208 psia). Typically, the system 10 uses spiral furnace circuitry for the evaporator 12 because a vertical tube design is more sensitive to upsets and nonuniform tube-to-tube heating. However, for start-up and low load operation, special by-pass systems are still needed.

Figure 2:
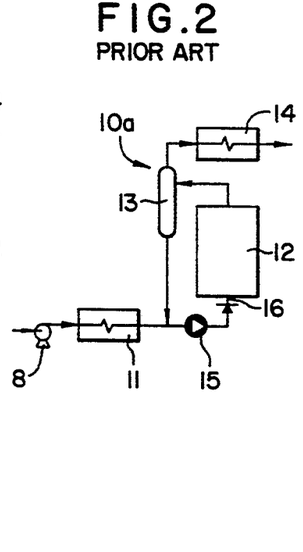
FIG. 2 is a schematic view illustrating a second known once-through boiler system.
Figure 3:
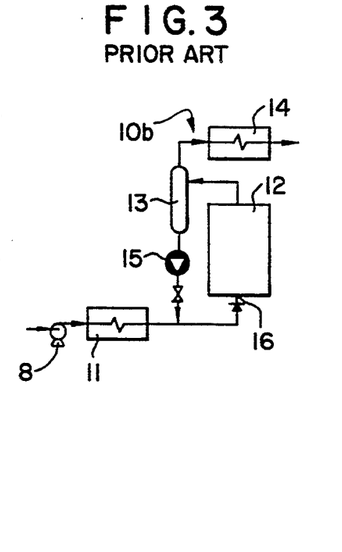
FIG. 3 is a schematic view illustrating a third known once-through boiler system.

To accommodate start-up and low load operating conditions, once-through boiler designs with superimposed recirculation systems 10a and 10b have been used and are illustrated in FIGS. 2 and 3. These recirculation systems permit partial recirculation of fluid to the furnace walls in order to increase the fluid velocity in the evaporator tubes by incorporating circulation pumps 15 and orifices 16. The design in many applications allows the furnace 12 to remain at constant pressure, typically supercritical pressure, and utilizes a separator or flash tank 13 for reducing the superheater pressure to subcritical pressures at start-up and low loads. These types of once-through boiler systems 10a and 10b typically utilize a vertical furnace tube evaporator design.

Once-through boiler designs that utilize both spiral and vertical tube furnace evaporators have been sold by many boiler manufacturers. These designs have been developed for either supercritical or subcritical steam pressures. However, a vertical tube once-through boiler for sliding pressure applications has recently been put into service. The sliding pressure operation of this vertical tube once-through boiler is restricted to approximately 40% minimum load due to the flow requirements of the evaporator. Except for certain fuels and sizes of spiral-tube furnaces, a spiral tube furnace does not have this restriction. For these few exceptions, a higher than desired minimum flow results due to the flow requirements of the evaporator. The spiral tube furnace permits greater freedom in matching the tube diameter and mass velocity of the furnace to ensure tube cooling and flow stability in the parallel furnace evaporator tubes. It also allows each tube of the furnace to run through all of the various heat zones in the combustion chamber, so that differences in total heat input between tubes will be kept to a minimum.

Figure 4:
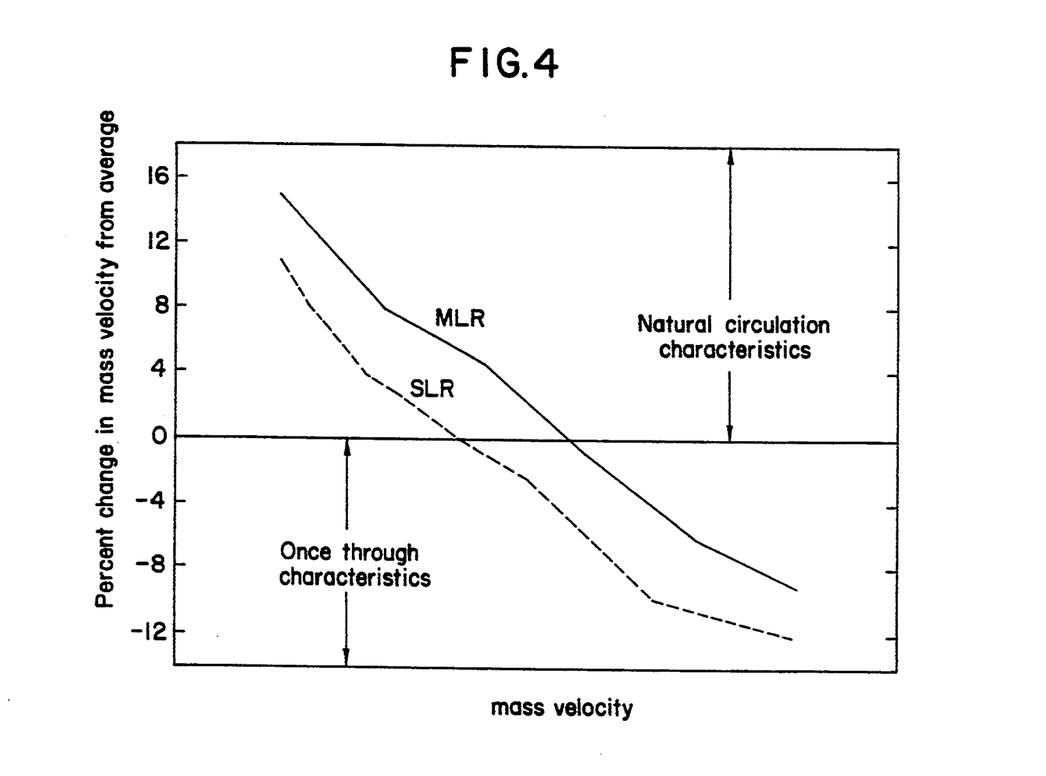
FIG. 4 is a graph plotting changes in mass characteristics for vertical furnace tubing.

The development of a vertical tube sliding pressure once-through boiler is needed due to the higher cost of the spiral furnace design when compared to a vertical furnace design. The construction of a forced circulation once-through boiler requires the use of a very large number of parallel tubes, welded together to form membrane panels. A fundamental requirement for membrane wall integrity is uniform fluid and metal temperature in all tubes at each furnace level. Until now, the major problem with the vertical tube design was due to the large heating difference between individual tubes in the furnace. In vertical tube furnaces, the heating difference between tubes is approximately 2.5 times as great as in a spiral tube furnace design. Average mass velocities of 1,500,000 to 2,000,000 lb/hr-ft$^2$ are typical velocities used in current once-through boiler designs. These mass velocities when subjected to typical peripheral furnace heat absorption variations (which can be 35% or more than average), result in a velocity variation that decreases in magnitude. This trend is called the once-through characteristic of a boiler tube. In the once-through mode, the velocity change due to an increase in heat is negative as shown in FIG. 4. If excessive heat input is applied to a single tube, a reduction in fluid mass velocity occurs in that tube, causing an additional increase in the outlet temperature of the fluid in the tube.

If the furnace tubes are operated with reduced mass velocities, the result with respect to any single tube that is exposed to excessive heat is an increase in the mass velocity. This type of change in mass velocity is referred to as the natural circulation characteristic. To be able to use lower mass velocities for the furnace design of a vertical tube once-through boiler requires the use of ribbed tubes in the burner zone to avoid departure from nucleate boiling (DNB).

Figure 6:
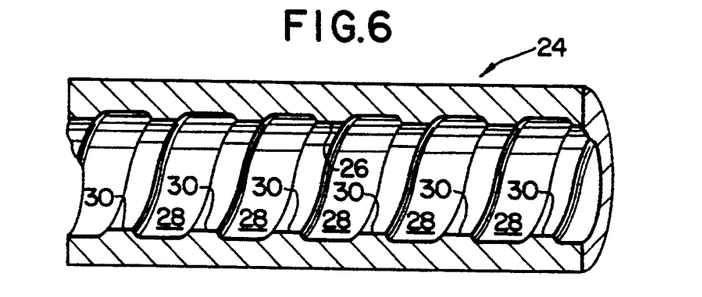
FIG. 6 is a view in longitudinal cross-section of a single-lead ribbed (SLR) tube having a single continuous internal helical rib.
Figure 7:
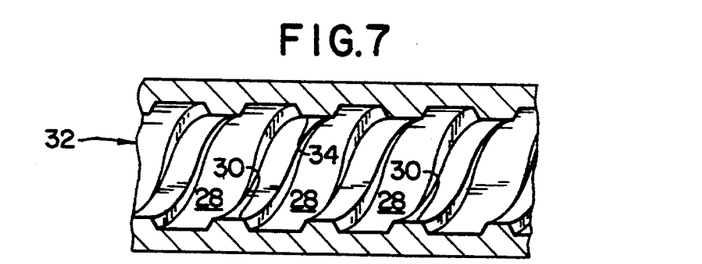
FIG. 7 is a view in cross-section of a multiple-lead ribbed (MLR) tube having multiple continuous internal helical ribs.
Figure 8:
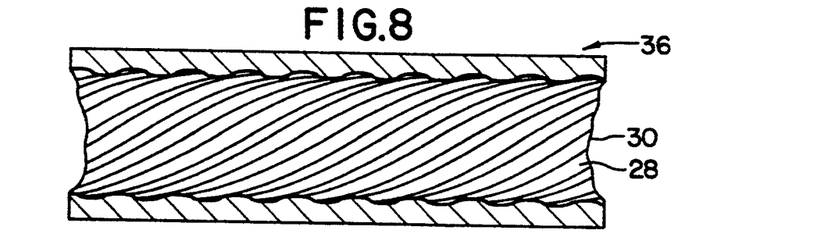
FIG. 8 is a view in longitudinal cross-section of another MLR tube.

Single-lead ribbed (SLR) tubes have been employed by The Babcock & Wilcox Company (B&W), assignee of the present invention, in once-through, vertical tube, subcritical pressure boilers. Multi-lead ribbed (MLR), tubes have been employed by B&W in some applications to once-through, vertical tube, supercritical pressure boilers, and to once-through, spiral-tube boilers operating at both sub- and supercritical pressures. Examples of these SLR and MLR tube geometries are shown in FIGS. 6–8 herein. U.S. Pat. Nos. 3,088,494 and 3,289,451 to Koch, et al. disclose, respectively, ribbed vapor generating tubes for sub-critical pressure vapor generators, and a method and apparatus for forming internal helical ribbing in a tube of the type disclosed in U.S. Pat. No. 3,088,494.

For these types of ribbed tubes, the heat transfer characteristics of the tubes are extremely good even for low mass velocities of fluid through the tubes. Generally SLR tubes permit higher heat fluxes than MLR tubes for the same mass velocity. The heat transfer performance of the SLR tube has been documented in the open literature. See, for example:

(1) "The Effects of Nucleate Boiling Versus Film Boiling on Heat Transfer in Power Boiler Tubes", H.S. Swenson, J.R. Carver, G. Szoeke, Journal of Engineering for Power, Trans. ASME, Oct. 1962, pp. 365–71;

(2) "Flow Boiling Crisis in Grooved Boiler-Tubes", K. Nishikawa, T. Fujii, S. Yoshida and M. Ohno, Proceedings of the Fifth International Heat Transfer Conference, Vol. IV, 1974, pp. 270–74; and (3) *Steam: its generation and use*, 40th ed., Copyright © 1992, The Babcock & Wilcox Company.

The heat transfer performance of MLR tubes has also been documented in the open literature. See, for example, reference (3) above, as well as the following references:

(4) "Critical Heat Flux in Inclined and Vertical Smooth and Ribbed Tubes", G.W. Watson, R.A. Lee, and M. Wiener, Fifth International Heat Transfer Conference, Vol. IV, 1974;

(5) "Latest Developments in Natural Circulation Boiler Design", M. Wiener, Proceedings of the American Power Conference, Apr. 18-20, 1977;

(6) "Elements of Two-Phase Flow in Fossil Boilers", J.B. Kitto and M.J. Albrecht, presented to the NATO Advanced Study Institute on Thermal-Hydraulic Fundamentals and Design of Two-Phase Flow Heat Exchangers, Porto, Portugal, Jul. 6-16, 1987.

(7) "Fossil-Fuel-Fired boilers: Fundamentals and Elements", J.B. Kitto and M.J. Albrecht, Chapter 6 of *Boilers, Evaporators and Condensers*, pp. 179-275, John Wiley and Sons, Inc.; and (8) "Heat Transfer Characteristics of Rifled Tubes in the Near Critical Pressure Region", Makio Iwabuchi, Mikio Tateiwa, Hisao Haneda, Proceedings of the 7th International Heat Transfer Conference, Vol. 5, 1982, pp. 313-18.

In a once-through, vertical tube, sliding pressure boiler design the use of the MLR tubes described above is not sufficient for developing the most optimized furnace evaporator design. The main reason is that higher mass velocities must be used to avoid departure from nucleate boiling (DNB), and thus the benefit of the natural circulation characteristic is lost. In addition, a higher mass velocity requires larger feed pumps and uses more power, which is an economic disadvantage. Heat transfer problems at or very near the critical pressure point (3208 psia) exist with the use of MLR tubes. As described in Reference 8 above, at or near the critical pressure point the effect of the swirl in the MLR tubes diminishes, due to the small density difference between steam and water, causing critical heat flux (CHF) conditions to appear at higher mass velocities than in SLR tubes. The CHF in tubes causes excessive metal temperatures which must be avoided. This problem causes difficulty in designing a furnace evaporator for sliding pressure operation at low mass velocities. For sliding pressure operation, a certain load point will exist where the heat flux applied to the tube will be high enough that the heat transfer through the MLR tube wall into the fluid therein will not be sufficient and elevated tube temperatures will exist. The possibility of furnace tube failure could occur.

It is thus apparent that a new design for a once-through sliding pressure vapor generator is needed to overcome the above-described disadvantages. In particular, a once-through, vertical tube, sliding pressure boiler or steam generator is needed in the field due to the higher cost of spiral furnace designs when compared to a vertical tube design.

SUMMARY OF THE INVENTION

The present invention pertains to once-through, sliding pressure boilers or steam generators that have furnace wall tube orientations that can be vertical, horizontal or spiral (i.e., at an angle between the horizontal and vertical orientations), singly or in any combination thereof. One aspect of the present invention is drawn to a once-through sliding pressure steam generator comprising an enclosure having an outlet and heat exchanger surfaces made of smooth bore tubes, single lead ribbed (SLR) tubes and multiple ribbed lead (MLR) tubes in a particular arrangement. All of these tubes are preferably constructed as membrane wall tube panels.

The present invention overcomes the above-identified problems by using SLR tubing in the furnace in those locations where the heat transfer will be impaired if MLR tubing is used. SLR tubes operate on a different principle than swirl generation, and therefore do not depend upon the density difference of steam and water. Their CHF performance is adequate at near critical pressures in the range of lower mass velocities proposed in this invention.

The steam generator includes burners for burning fuel and air within the enclosure which, in turn, create a low heat flux region, a medium heat flux region, and a high heat flux region of the steam generator. Water and/or steam (or, at supercritical pressures, the term "fluid" is used) flows through the tubes of the wall panels which provide an efficient heat exchanger. The smooth bore tubes are located at the low heat flux region of the steam generator, while the single lead ribbed (SLR) tubes and the multiple lead ribbed (MLR) tubes are selectively located at the medium and high heat flux regions of the steam generator.

Even though this invention can be used in steam generators employing various arrangements of vertical, horizontal or spiral tubes, it is a primary purpose of the present invention to provide a once-through, vertical tube, sliding pressure boiler or steam generator suitable for sliding pressure operation over a wide load range which provides the capability to operate at low minimum loads and with low pressure drop.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which preferred embodiments of the invention is illustrated.

DESCRIPTION OF THE PREFERRED EMBODIMENTS

Figure 5:
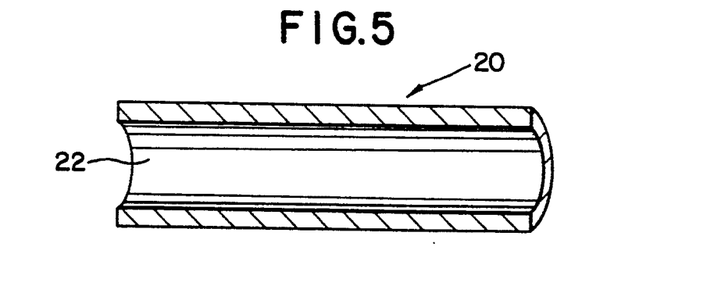
FIG. 5 is a view in longitudinal cross-section of a tube having a smooth bore.

Referring to the drawings generally, wherein like numerals designate the same or similar elements throughout the several drawings, and to FIGS. 5–8 in particular, there are shown longitudinal cross-section views of the various types of tubes used in the present invention. FIG. 5 shows a tube 20 having a smooth bore 22. FIG. 6 shows a single-lead ribbed (SLR) tube 24 whose inner surface 26 has a single continuous, internal helical groove 28 located inbetween continuous helical lands or ribs 30. FIG. 7 show a multiple-lead ribbed (MLR) tube 32 whose inner surface 34 has a pair of continuous, helical grooves 28 located inbetween continuous helical lands or ribs 30. FIG. 8 shows yet another version of a multiple-lead ribbed (MLR) tube 36 having a plurality of continuous, internal helical grooves 28 located inbetween continuous helical lands or ribs 30. The particular geometric arrangement of grooves 28 and lands 30 used in the SLR or MLR tubes would be selected as needed to achieve desired performance and mechanical requirements, as would the tube outside diameter and minimum wall thickness. Applicable boiler and pressure vessel codes would of course be applied as is known to those skilled in the art.

Figure 9:
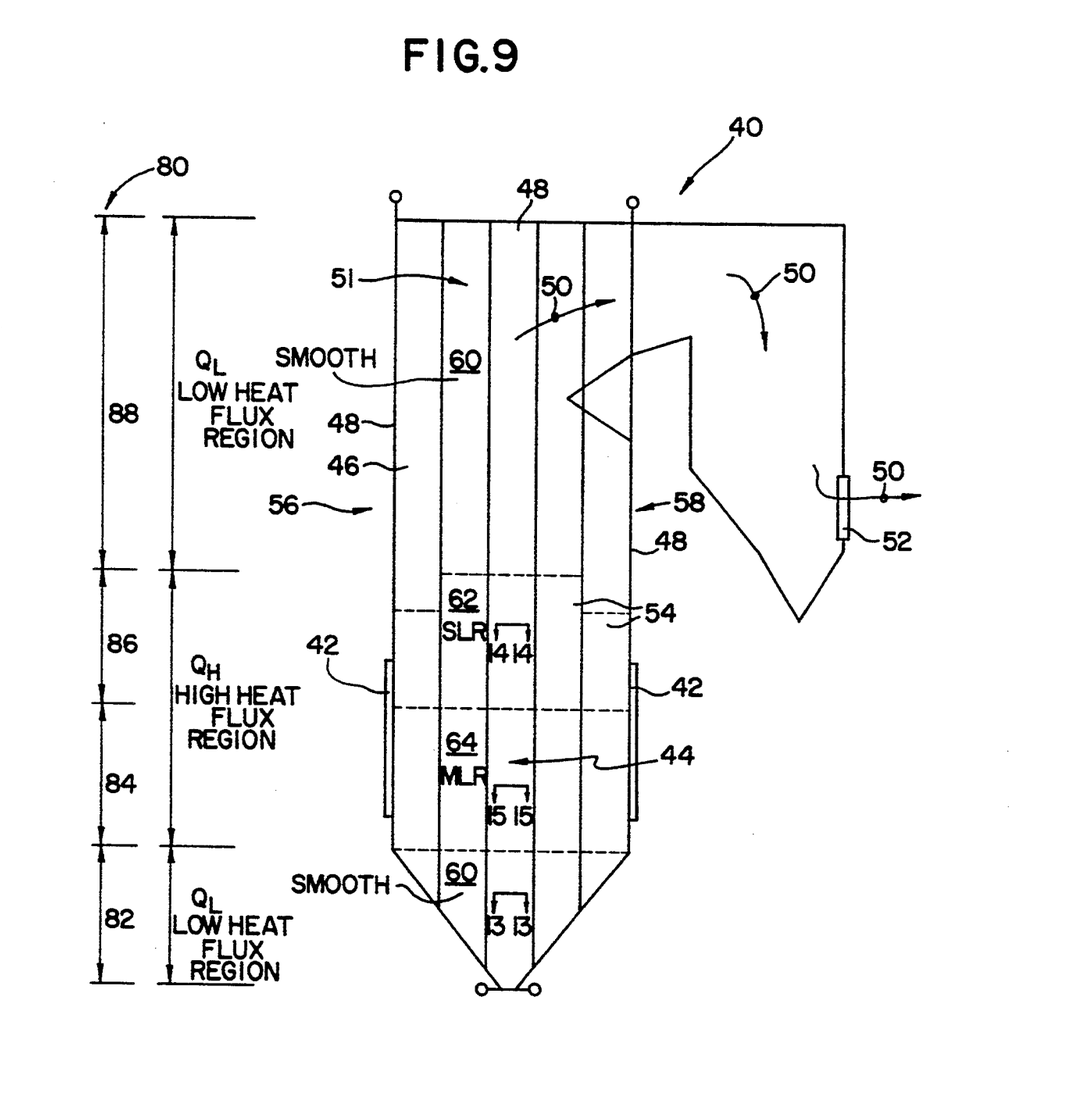
FIG. 9 is a schematic side view of a once-through, vertical tube steam generator suitable for sliding pressure operation according to a first embodiment of the present invention.
Figure 10:
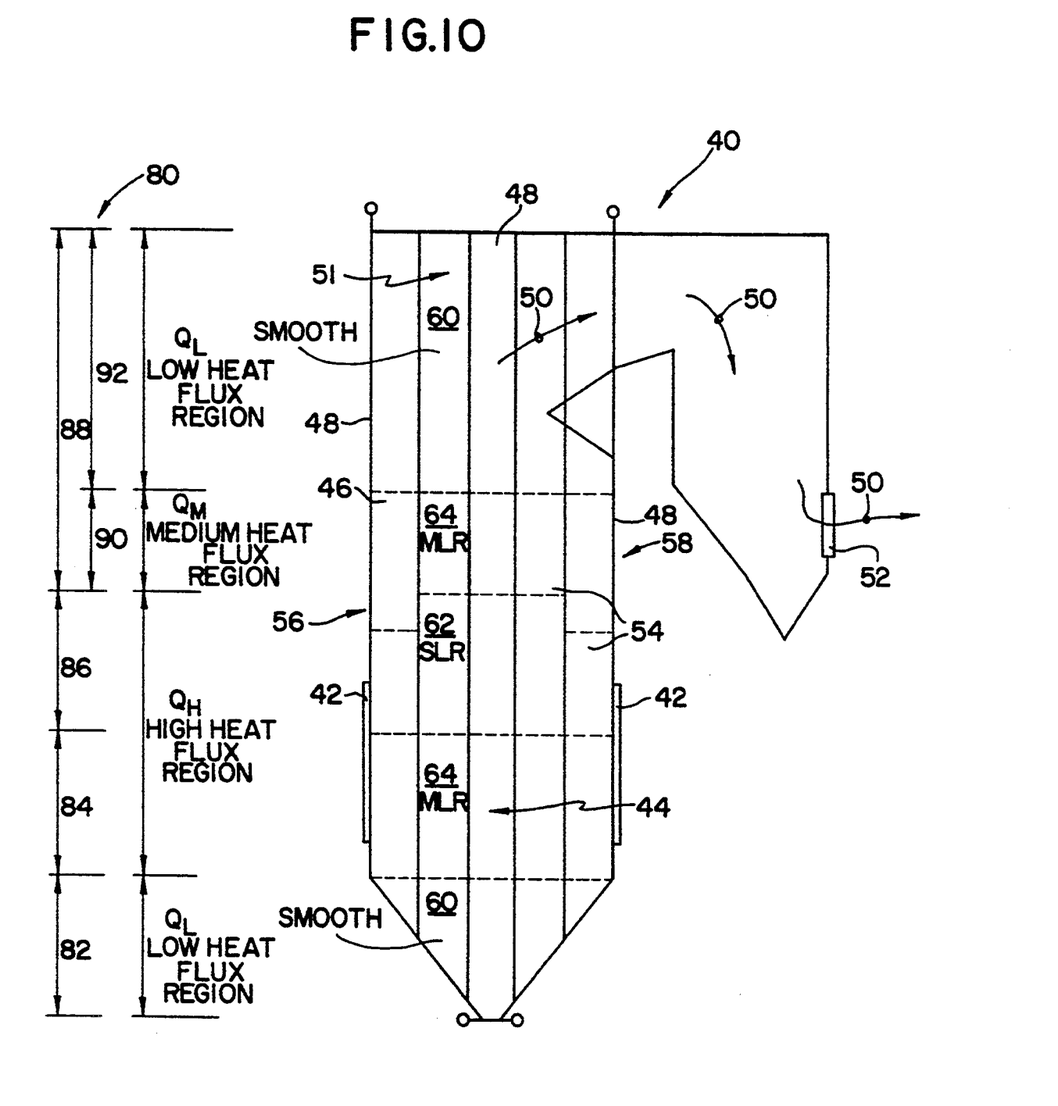
FIG. 10 is a schematic side view of a once-through, vertical tube steam generator suitable for sliding pressure operation according to a second embodiment of the present invention.
Figure 11:
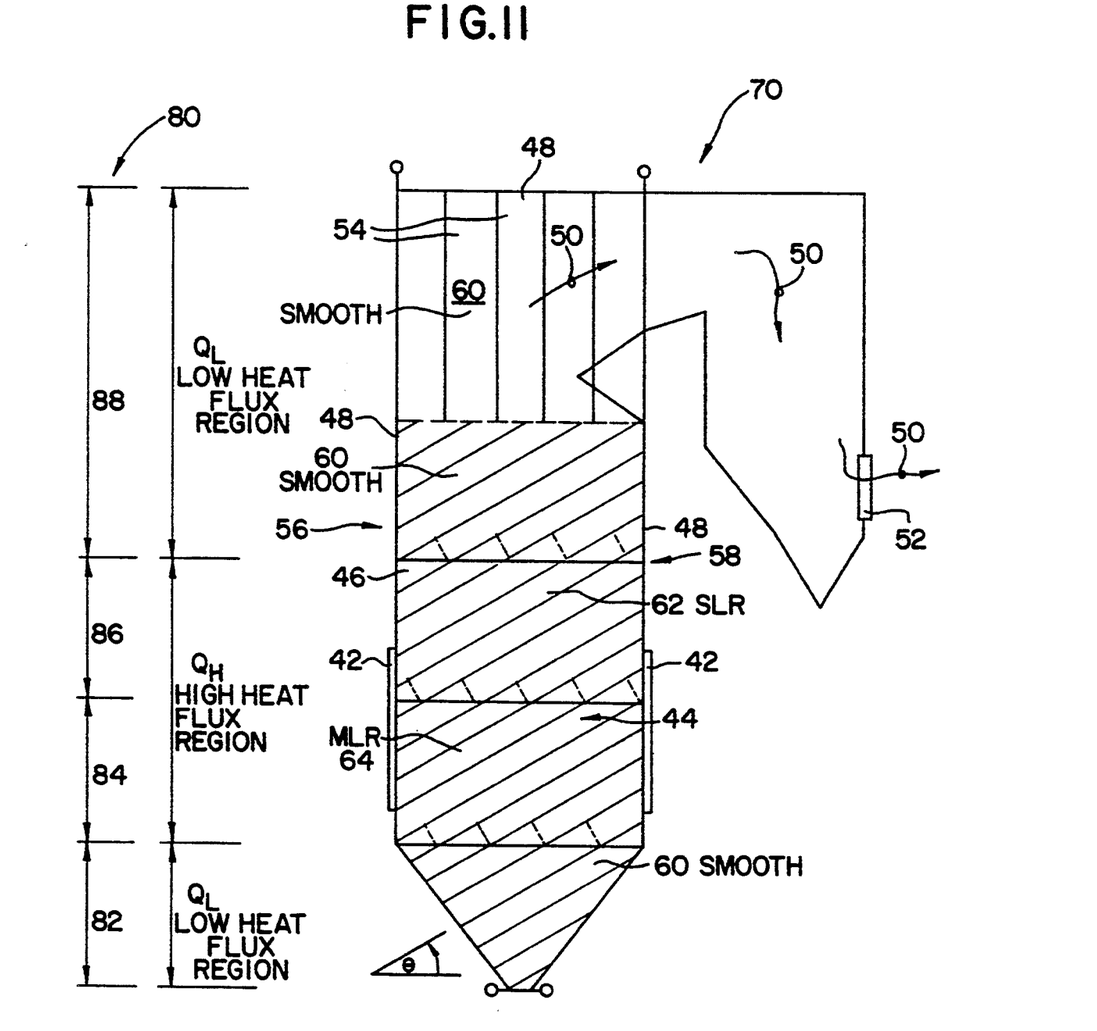
FIG. 11 is a schematic side view of a once-through, spiral tube steam generator suitable for sliding pressure operation according to a third embodiment of the present invention.
Figure 12:
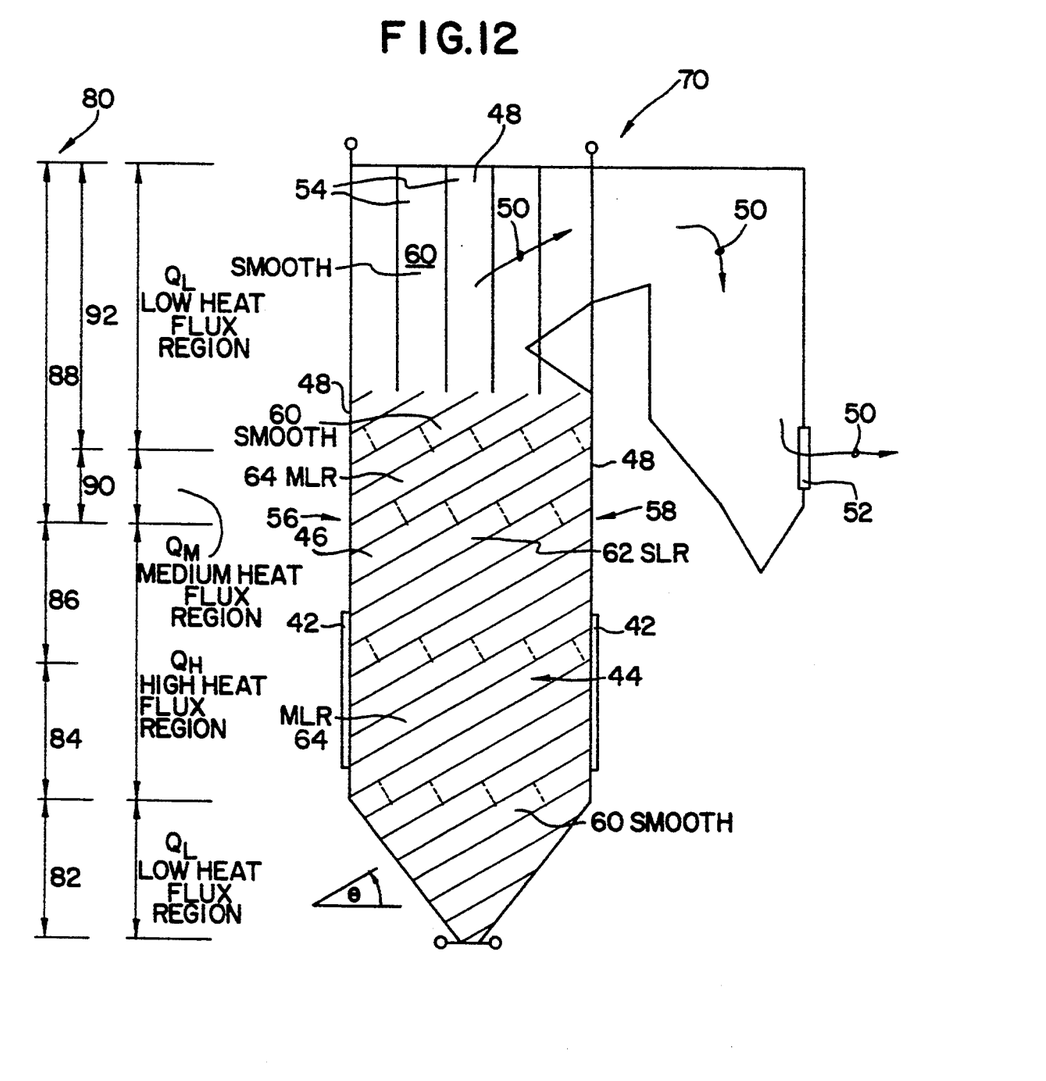
FIG. 12 is a schematic side view of a once-through, spiral tube steam generator suitable for sliding pressure operation according to a fourth embodiment of the present invention.

Referring now to FIGS. 9-12, there are shown several embodiments of the present invention. FIGS. 9 and 10 relate to a once-through vertical tube steam generator suitable for sliding pressure operation according to first and second embodiments of the present invention. FIGS. 11 and 12 relate to a once-through spiral tube steam generator suitable for sliding pressure operation according to third and fourth embodiments of the present invention.

Figure 13:
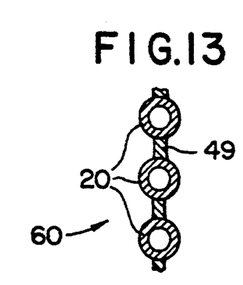
FIG. 13 is a schematic view in diametrical cross-section of a wall panel employing smooth tubes taken along line 14—14 of FIG. 9.
Figure 14:
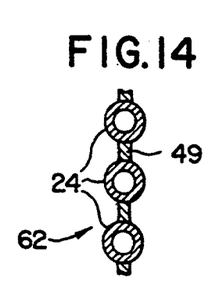
FIG. 14 is a schematic view diametrical cross-section of a wall panel employing SLR tubes taken along line 13—13 of FIG. 9.
Figure 15:
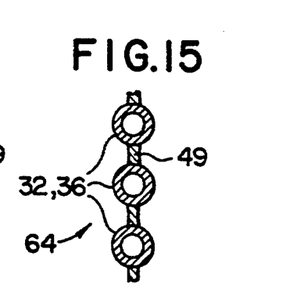
FIG. 15 is a schematic view diametrical cross-section of a wall panel employing MLR tubes taken along line 15—15 of FIG. 9.

Referring now to FIGS. 9 and 10 there is disclosed therein a vertical tube, once-through steam generator generally designated 40. Fuel burners, schematically represented at 42, provide a mixture of fuel and air which is combusted in burner zone 44 of furnace 46. Furnace 46 is partially defined by enclosure walls 48 comprised of a plurality of tubes interconnected by membrane 49 (see FIGS. 13-15) to form a gas-tight enclosure. The products of combustion 50 (hot flue gases, etc.) flow upwardly through the furnace 46 in the direction of arrow 50 across various pendant and horizontal heat transfer surface (not shown) and exit steam generator 40 at outlet 52. The products of combustion 50 transfer their heat to the surrounding enclosure walls 48 thereby heating the fluid flowing within the tubes comprising these walls.

The tubes comprising enclosure walls 48 are generally preformed in the shop into a plurality of panels 54 which are then field assembled via welding into the furnace enclosure walls 48. FIGS. 9 and 10 show an arrangement wherein the side walls 51 of the steam generator 40 comprise five such prefabricated panels 54, arranged substantially vertically. A suitable number of panels 54 would also comprise the front and rear walls 56, 58 respectively of the steam generator 40, the maximum width of each panel 54 being determined by shipping and/or other equipment limitations, most notably the particular placement of openings for fuel burners 42, and again would be arranged substantially vertically.

A fundamental requirement for membrane wall integrity is uniform fluid and metal temperature in all tubes at each furnace level. Until now, the major problem with the vertical tube design involved the large heating difference between the individual tubes in the furnace.

As indicated earlier, in vertical tube furnaces, the heating difference between tubes is approximately 2.5 times as great as in a spiral tube furnace design. Average mass velocities of 1,500,000 to 2,000,000 lb/hr-ft$^2$ are typical velocities used in current once-through boiler designs. These mass velocities, when subjected to typical peripheral furnace heat absorption variations, which can be 35% or more than average, result in a velocity variation that decreases in magnitude. This trend is called the once-through characteristic of a boiler tube. In the once-through mode, the velocity change due to an increase in heat is negative such as shown in FIG. 4. If excessive heat input is applied to a single tube, a reduction in fluid mass velocity occurs in that tube, causing an additional increase in the outlet temperature of the fluid in the tube.

If the furnace tubes are operated with reduced mass velocities, the result with respect to any single tube that is exposed to excessive heat is an increase in the mass velocity. This type of change in mass velocity is referred to as the natural circulation characteristic. In order to be able to use lower mass velocities for the furnace design of a vertical once-through boiler, the use of ribbed tubes in the enclosure walls 48 is required in order to avoid departure from nucleate boiling (DNB), and the resulting higher metal temperatures.

This problem is overcome in the present invention by a particular placement of smooth, SLR and/or MLR tubes in the enclosure walls 48. SLR tubes 24 are located in the furnace 46 at locations where the heat transfer would be impaired if MLR tubing 32, 36 was used. SLR tubes 24 operate on a different principle than swirl generation, and therefore do not depend upon the density difference between steam and water. Their CHF performance is adequate at near critical pressures in the range of lower mass velocities proposed by the present invention.

In accordance with the present invention, SLR tubes 24 and MLR tubes 32, 36 are selectively applied to the panels comprising vertical tube, once-through steam generator 40 to make it more suitable for sliding-pressure operation, as shown in FIGS. 9 and 10, and to the panels comprising spiral tube, once-through steam generator 70 to make it more suitable for sliding-pressure operation, as shown in FIGS. 11 and 12. The location of each type of tubing in either steam generator 40 or 70 is determined based upon the heat transfer and flow characteristics in the tubes for all loads that the steam generators 40 and 70 are expected to experience during operation. This would basically cover the range of loads from a minimum load of approximately 15 to 30% of maximum continuous rating (MCR) steam flow to MCR load.

The left-hand sides of FIGS. 9–12 roughly define a vertical extent of low, medium and high heat flux regions ($Q_L$, $Q_M$, and $Q_H$ respectively) within the furnace 46 of steam generators 40 and 70. It is understood that the actual vertical elevations where one region ends and another begins will depend on a variety of parameters, as discussed below. The approximate numerical values for these heat flux ranges can be roughly defined as set forth below:

$Q_L$ 0 to 40,000 BTU/hr-ft$^2$
$Q_M$ 30,000 to 80,000 BTU/hr-ft$^2$
$Q_H$ 50,000 to greater than 100,000 BTU/hr-ft$^2$ The combustion process occurring within the furnace 46 largely determines this vertical variation in heat flux rates, as created by the fuel burners 42 and the particular fuels. It will be appreciated by those skilled in the art of once-through steam generator design that the overlap in numerical values for these regions accounts for parameters other than heat flux that can influence the occurrence of Critical Heat Flux or CHF. The actual heat flux applied to the furnace wall enclosure tubes 48 is the major parameter responsible for determining whether a CHF condition is present. However, other parameters such as fluid pressure, fluid velocity, fluid quality, tube diameter, tube inclination and tube surface finish also affect the CHF conditions for an enclosure wall tube 48. Thus the nomenclature of low, medium and high heat flux regions ($Q_L$, $Q_M$, and $Q_H$ respectively) as applied to regions within the furnace 46 of steam generators 40 and 70 is more of a shorthand way of referring to areas where a certain type of tube is required. In some cases, the heat flux values in the region(s) above the "high" heat flux region, $Q_H$ do not decrease sufficiently to "low" heat flux region, $Q_L$ values. The designation "medium" heat flux region, $Q_M$ is used instead and MLR tubes 32, 36 (rather than smooth tubes 20) are used in those corresponding portions of enclosure walls 48. In other cases, the heat flux values do decrease sufficiently to "low" heat flux region, $Q_L$ levels and smooth tubes 20 can again be employed.

As shown in FIGS. 9 and 10, the vertical tube, once-through sliding pressure steam generator 40 has a novel furnace design that comprises smooth tubes 20 incorporated in smooth tube enclosure wall panels 60 located in low heat flux regions $Q_L$ of the furnace 46 and a combination of SLR tube 24 enclosure wall panels 62 and MLR tube 32, 36 enclosure wall panels 64 located in high and medium heat flux regions $Q_H$ and $Q_M$ in order to avoid DNB and CHF and meet the tube metal temperature limitations. See FIGS. 13–15 for cross-sectional views of such panels.

As shown in FIGS. 11 and 12, the spiral tube, once-through sliding pressure steam generator 70, has a novel furnace design that comprises smooth bore tubes 20 incorporated into spiral smooth tube enclosure wall panels 60 located in the low heat flux regions $Q_L$ of the furnace 46 and a combination of SLR tube 24 enclosure wall panels 62 and MLR tube 32, 36 enclosure wall panels 64 located in high and medium heat flux regions $Q_H$ and $Q_M$ in order to avoid DNB and CHF and meet tube metal temperature limitations. As shown in FIGS. 11 and 12, the tubes forming the enclosure walls 48 are inclined at an acute angle $\theta$ from the horizontal, typically 5°–10° and wrap around the entire perimeter of the furnace 46, starting at a lower portion of the furnace 46. At some upper location defined by various parameters known to those skilled in the art, the tubes's orientation is made vertical to facilitate design and support considerations.

The once-through boiler or steam generator benefits from a natural circulation flow characteristic at lower loads because the flow change in the tubes forming the enclosure walls 48 due to heat variation will be compensated for in a manner that will protect the tube from a possible critical heat flux condition. If the heat absorbed by a tube increases, the flow proportionately increases. The heat variation across the furnace walls at lower loads, such as below approximately 70% load, can be more variable than at loads greater than approximately 70% load. Also, the flow rate in a tube is proportional to the load, so therefore at a lower load, for example at approximately 50% load, the flow will be roughly half of the flow rate at full load. Therefore, the design must consider the heat flux and the possible flow variations that could exist at all possible loads. The use of natural circulation flow characteristics at the lower loads helps to reduce the possibility of a critical heat flux condition by allowing the flow to increase for an increase in the heat flux applied to the tube. If the boiler or steam generator was to operate with once-through flow characteristics at reduced loads, the design would be penalized by the fact that the flow would decrease as the heat flux increases, resulting in a worst situation from a critical heat flux point of view. A natural circulation flow characteristic is desired at lower boiler or steam generator loads ($\leq$70% load), while at higher loads a once-through flow characteristics tend to exist.

In the vertical tube, once-through sliding pressure steam generator 40, and the spiral tube, once-through sliding pressure steam generator 70, the length and the location of the MLR and SLR combinations are adjusted for each panel 64, 62 in order to achieve optimum natural circulation flow characteristics within the SLR tubes 24, and MLR tubes 32,36. The same procedure would be used in the spiral tube steam generator 70 except that the adjustment would be made for each panel 64 and 62 to achieve optimum natural circulation flow characteristics. Since SLR tubes 24 have higher flow resistance than MLR tubes 32, 36 or smooth tubes 20, their use must be limited only to locations where they are absolutely needed, because higher flow resistance has a tendency to reduce the desired natural circulation flow characteristic effect. However, proper location and the correct proportion of SLR tubes 24 and the MLR tubes 32, 36 around the periphery minimizes the fluid and metal temperature difference between all vertical membrane wall tube panels or all spiral membrane wall tube panels at any elevation in order to stay below an allowable limit of 100° F. at all loads.

With natural circulation flow characteristics, the tubes in the evaporators of the steam generators 40, 70 have similar outlet temperatures despite the different heat characteristics that are a function of the tube design used, whether the furnace tube orientation is vertical or spiral. The actual design of the locations of each type of tubing is a function of the geometric size of the furnace, the kind and type of fuel, and the load change requirements of the unit. The application of this above-described concept can be distinct for each vertical or spiral panel of the furnace 46 in each type of steam generator 40, 70. The location of the transitions between types of tubing in one panel can be at the same or at a different elevation, either higher or lower, than the location of the transition between types of tubing in a panel adjacent to it.

To further explain the locations in the steam generators 40 and 70 where the various types of smooth bore tubes 20, SLR tubes 24, and MLR tubes 32 would be located, FIGS. 9-12 include a vertical legend 80. Vertical legend 80 roughly defines/identifies several regions of the furnace 46. Starting at a bottom of the furnace 46 and moving directly and vertically upwardly in order are lower portion 82, first intermediate portion 84, second intermediate portion 86, and upper portion 88. Upper portion 88 is further subdivided, for the embodiments of FIGS. 10 and 12, into a first part 90, and a second part 92 directly and vertically above first part 90. The various types of tubes 20, 24, and 32 can thus be described as being located generally in the aforementioned regions, as well as by the earlier description wherein certain types of tubes are located based upon the thermal hydraulic conditions to which each tube is exposed.

The present invention solves the thermal hydraulic problems that are associated with the use of MLR tubing and smooth bore tubing in the known vertical tube, once-through sliding pressure steam generators as well as spiral tube or even horizontal once-through sliding pressure units. In a horizontal tube, once-through steam generator, acute angle $\theta$ would be 0°; as the tubes complete a single wrap around the outside perimeter of the furnace, they eventually will be bent towards vertical for a short distance to achieve a desired vertical offset from the previous level, and begin their horizontal wrap again, usually in a direction opposite to their initial horizontal direction. There are great cost advantages in utilizing a vertical tube furnace, according to the present invention, over the known spiral furnace designs. The present invention permits lower minimum loads and has lower pressure drop across the furnace circuitry thus allowing the use of smaller feed pumps which require less power to operate. The use of this improved sliding pressure once-through boiler design provides increased efficiency at full and part loads over the known once-through boilers and subcritical drum boilers.

While specific embodiments of the invention have been shown and described in detail to illustrate the application of the invention, it will be understood that the invention may be embodied otherwise without departing from such principles.

I claim:

1. A once-through steam generator suitable for sliding pressure operation over a wide load range and especially at low loads, the steam generator having a furnace partially defined by fluid-cooled enclosure walls, comprising:
   fuel burner means for burning fuel and air in a combustion process which creates a vertical variation in heat flux rates on the enclosure walls including one or more low and one or more high heat flux regions; and
   wherein the fluid-cooled enclosure walls surrounding the one or more low heat flux regions of the furnace incorporate smooth bore tubes, and the fluid-cooled enclosure walls surrounding the one or more high heat flux regions incorporate both single-lead ribbed (SLR) tubes and multiple-lead ribbed (MLR) tubes to avoid departure from nucleate boiling (DNB) and critical heat flux (CHF) conditions in the one or more high heat flux regions.

2. The once-through steam generator according to claim 1, wherein the fluid-cooled enclosure walls comprise:
   smooth bore tubes forming the fluid-cooled walls surrounding a lower portion of the furnace;
   multiple-lead ribbed (MLR) tubes forming the fluid-cooled walls surrounding a first intermediate portion of the furnace located directly and vertically above the lower portion;
   single-lead ribbed (SLR) tubes forming the fluid-cooled walls surrounding a second intermediate portion of the furnace located directly and vertically above the first intermediate portion; and
   smooth bore tubes forming the fluid-cooled walls surrounding an upper portion of the furnace located directly and vertically above the second intermediate portion, the tubes in each portion of the furnace being fluidically connected to one another.

3. The once-through steam generator according to claim 2, wherein the tubes in each portion of the furnace are fluidically connected to one another such that fluid entering the fluid-cooled walls at the lower portion of the furnace may be conveyed to the fluid-cooled walls at the upper portion of the furnace.

4. The once-through steam generator according to claim 1, wherein the combustion process creates a vertical variation in heat flux rates on the enclosure walls including one or more low heat flux regions, one or more medium heat flux regions, and one or more high heat flux regions.

5. The once-through steam generator according to claim 4, wherein the fluid-cooled enclosure walls comprise:
   smooth bore tubes forming the fluid-cooled walls surrounding a lower portion of the furnace;
   multiple-lead ribbed (MLR) tubes forming the fluid-cooled walls surrounding a first intermediate portion of the furnace located directly and vertically above the lower portion;
   single-lead ribbed (SLR) tubes forming the fluid-cooled walls surrounding a second intermediate portion of the furnace located directly and vertically above the first intermediate portion;
   multiple-lead ribbed (MLR) tubes forming the fluid-cooled walls surrounding a first part of an upper portion of the furnace, the first part located directly and vertically above the second intermediate portion; and
   smooth bore tubes forming the fluid-cooled walls surrounding a second part of the upper portion of the furnace, the second part located directly and vertically above the first part of the upper portion, the tubes in each portion of the furnace being fluidically connected to one another.

6. The once-through steam generator according to claim 5, wherein the tubes in each portion of the furnace are fluidically connected to one another such that fluid entering the fluid-cooled walls at the lower portion of the furnace may be conveyed to the fluid-cooled walls at the upper portion of the furnace.

7. The once-through steam generator according to claim 1, wherein the fluid-cooled enclosure walls comprise preformed, shop-assembled, welded membrane tube wall panels which may be assembled via welding between adjacent panels to create the furnace enclosure walls to form a gas-tight enclosure.

8. The once-through steam generator according to claim 7, wherein the preformed, shop-assembled, welded membrane tube wall panels may be assembled into substantially vertical panels of tubes.

9. The once-through steam generator according to claim 7, wherein the preformed, shop-assembled, welded membrane tube wall panels surrounding at least lower and intermediate portions of the furnace may be assembled into spiral panels of tubes inclined at an acute angle $\theta$ with respect to the horizontal as they wrap around a perimeter of the furnace.

10. In a once-through, vertical tube steam generator having a furnace partially defined by fluid-cooled enclosure walls, an arrangement of fluid-conveying tubes forming the enclosure walls comprising:

smooth bore tubes forming the fluid-cooled walls surrounding a lower portion of the furnace;

multiple-lead ribbed (MLR) tubes forming the fluid-cooled walls surrounding a first intermediate portion of the furnace located directly and vertically above the lower portion;

single-lead ribbed (SLR) tubes forming the fluid-cooled walls surrounding a second intermediate portion of the furnace located directly and vertically above the first intermediate portion; and smooth bore tubes forming the fluid-cooled walls surrounding an upper portion of the furnace located directly and vertically above the second intermediate portion, the tubes in each portion of the furnace being fluidically connected to one another.

11. The arrangement of fluid-conveying tubes forming the enclosure walls of the once-through, vertical tube steam generator according to claim 10, wherein the tubes in each portion of the furnace are fluidically connected to one another such that fluid entering the fluid-cooled walls at the lower portion of the furnace may be conveyed to the fluid-cooled walls at the upper portion of the furnace.

12. The arrangement of fluid-conveying tubes forming the enclosure walls of the once-through, vertical tube steam generator according to claim 10, further comprising:

multiple lead ribbed (MLR) tubes forming the fluid-cooled walls surrounding a first part of the upper portion of the furnace, the first part located directly and vertically above the second intermediate portion, the smooth bore tubes forming the fluid-cooled walls surrounding the upper portion of the furnace being located in a second part of the upper portion of the furnace, the second part located directly and vertically above the first part of the upper portion.

13. The arrangement of fluid-conveying tubes forming the enclosure walls of the once-through, vertical tube steam generator according to claim 7, wherein the fluid-cooled enclosure walls comprise preformed, shop-assembled, welded membrane tube wall panels which may be assembled via welding between adjacent panels into substantially vertical panels of tubes to create the furnace enclosure walls to form a gas-tight enclosure.

14. In a once-through, spiral tube steam generator having a furnace partially defined by fluid-cooled enclosure walls, an arrangement of fluid-conveying tubes forming the enclosure walls comprising:

smooth bore tubes forming the fluid-cooled walls surrounding a lower portion of the furnace;

multiple-lead ribbed (MLR) Tubes forming the fluid-cooled walls surrounding a first intermediate portion of the furnace located directly and vertically above the lower portion;

single-lead ribbed (SLR) tubes forming the fluid-cooled walls surrounding a second intermediate portion of the furnace located directly and vertically above the first intermediate portion; and smooth bore tubes forming the fluid-cooled walls surrounding an upper portion of the furnace located directly and vertically above the second intermediate portion, the tubes in each portion of the furnace being fluidically connected to one another.

15. The arrangement of fluid-conveying tubes forming the enclosure walls of the once-through, spiral tube steam generator according to claim 14, wherein the tubes in each portion of the furnace are fluidically connected to one another such that fluid entering the fluid-cooled walls at the lower portion of the furnace may be conveyed to the fluid-cooled walls at the upper portion of the furnace.

16. The arrangement of fluid-conveying tubes forming the enclosure walls of the once-through, spiral tube steam generator according to claim 14, further comprising:

multiple lead ribbed (MLR) tubes forming the fluid-cooled walls surrounding a first part of the upper portion of the furnace, the first part located directly and vertically above the second intermediate portion, the smooth bore tubes forming the fluid-cooled walls surrounding the upper portion of the furnace being located in a second part of the upper portion of the furnace, the second part located directly and vertically above the first part of the upper portion.

17. The arrangement of fluid-conveying tubes forming the enclosure walls of the once-through, spiral tube steam generator according to claim 14, wherein the fluid-cooled enclosure walls comprise preformed, shop-assembled, welded membrane tube wall panels which may be assembled via welding between adjacent panels to create the furnace enclosure walls to form a gas-tight enclosure.

18. The arrangement of fluid-converting tubes forming the enclosure walls of the once-through, spiral tube steam generator according to claim 14, wherein the preformed, shop-assembled, welded membrane tube wall panels surrounding at least lower, first intermediate, second intermediate and a first part of the upper portion of the furnace are inclined at an acute angle $\theta$ with respect to the horizontal as they wrap around a perimeter of the furnace.

19. The arrangement of fluid-conveying tubes forming the enclosure walls of the once-through, spiral tube steam generator according to claim 14, wherein the tubes forming the enclosure walls surrounding at least lower, first intermediate, second intermediate, and a first part of the upper portion of the furnace are inclined at an acute angle $\theta$ with respect to the horizontal as they wrap around a perimeter of the furnace.

20. The arrangement of fluid-conveying tubes forming the enclosure walls of the once-through, spiral tube steam generator according to claim 19, wherein the tubes forming the enclosure walls surrounding the second part of the upper portion of the furnace extend substantially vertically.

* * * * *

UNITED STATES PATENT AND TRADEMARK OFFICE
CERTIFICATE OF CORRECTION

PATENT NO. : 5,390,631
DATED : Feb. 21, 1995
INVENTOR(S) : Albrecht

It is certified that error appears in the above-indentified patent and that said Letters Patent is hereby corrected as shown below:

On the Title page at Attorney, Agent, or Firm, the second attorney's name is listed as "Robert Marich" and should be -- Eric Marich--.

Signed and Sealed this

Fifth Day of September, 1995

Attest:

BRUCE LEHMAN

Attesting Officer

Commissioner of Patents and Trademarks